United States Patent

Ohhata et al.

[11] Patent Number: 5,417,907
[45] Date of Patent: May 23, 1995

[54] DIE PLATE FOR PLASTICS EXTRUDER

[75] Inventors: Toshihiro Ohhata, Moka; Hidenori Tasaki, Utsunomiya; Tetsushi Yamaguchi, Moka; Makoto Shiina, Utsunomiya; Masao Fukuda; Hisayoshi Ikeshita, both of Moka, all of Japan

[73] Assignee: General Electric Company, Pittsfield, Mass.

[21] Appl. No.: 37,795

[22] Filed: Mar. 26, 1993

[30] Foreign Application Priority Data

Mar. 31, 1992 [JP] Japan .................................. 4-105563

[51] Int. Cl.⁶ ............................................. B29C 47/12
[52] U.S. Cl. .................... 264/169; 264/143; 425/311; 425/461
[58] Field of Search .................. 264/169, 142, 143; 425/382 R, 464, 331, 463, 311, 461, 308

[56] References Cited

U.S. PATENT DOCUMENTS

| | | | |
|---|---|---|---|
| 3,391,657 | 7/1968 | Reese | 425/464 |
| 4,056,597 | 11/1977 | Cooper | 264/169 |
| 4,138,208 | 2/1979 | Heckeroth | 425/382 R |
| 4,457,686 | 7/1984 | Rowland | 425/382 R |
| 4,822,546 | 4/1989 | Lohkamp | 425/463 |

FOREIGN PATENT DOCUMENTS 61-00614 1/1986 Japan .................................. 264/169

Primary Examiner—Jeffery R. Thurlow

[57] ABSTRACT

A die plate for use in the extrusion of plastics is provided. Said die plate is capable of preventing or substantially reducing the formation of resin masses at the die face of said die plate by providing an extrusion orafice having an increased diameter in the vicinity of said die face.

3 Claims, 1 Drawing Sheet

DIE PLATE FOR PLASTICS EXTRUDER

This invention relates to an extruder die plate for melt-extruding plastics and producing resin strands.

In the production of thermoplastic resins, mixing is carried out while melting the starting material, which consists of both the chief starting materials as well as the various additives such as reinforcing agents, stabilizers and flame retardants that have been added.

In this type of extruder, the starting materials are mixed and at the same time pressurized by a screw that turns within a barrel heated to a constant temperature, and are extruded in the form of a strand from an extrusion orifice in the die plate. Normally, the strand extruded in this way is cut to a given length, and a granular starting material (in the form of pellets) for molding various types of molding products is thereby prepared.

BACKGROUND OF THE INVENTION

As shown in FIG. 3, in the die plates 3 that have hitherto been widely used, an extrusion orifice 32 passes through to the die face 33 at a constant diameter. In die plates having this type of shape, when the resin that is extruded and flows from the left side of the diagram (as represented by arrow 34) passes through extrusion orifice 32, and a resin strand S emerges at the die face, a mass of deteriorated resin D forms around the strand. This resin mass D results from the adhesion, about the periphery of the opening in the die face of resin extrusion orifice 32 in the die plate 31, of some of the ingredients in the resin extruded as a strand.

The formation of such resin masses is believed to occur in the following manner. The flow rate during flow and passage of the molten resin through the extrusion orifice 32 in the die plate 31 slows near the inside walls of the hole relative to the center of the resin; when expansion occurs at the die face, the flow changes even more, so that a very small portion of the resin ingredients separate out and gradually grow.

When plastics are exposed to air for a long time while in a high-temperature state, the resin deteriorates, resulting in what is known as yellowing. In the case of the above-described resin masses, the fear is that, once these have grown to a certain size and the resin has deteriorated, they will separate spontaneously from the die face, be carried together with the strand to the cutting step, and become included in the granular starting material destined for the molded product. Because the resin masses are essentially masses of resin components that have been exposed to high temperatures and have deteriorated, the entry of these deteriorated components into the product presents a major problem in the quality control of the product.

SUMMARY OF THE INVENTION

The object of this invention is to provide a die plate for plastics extruders, which die plate has been improved so as to resolve the above-described drawbacks of the prior art and also to enable prevention or a substantial reduction in the formation of resin masses in the vicinity of the die face.

This invention features a die plate for plastics extruders, in which die plate the diameter of the resin extrusion orifice has been enlarged throughout a region down to a given depth from the die face.

In the die plate according to the present invention, when the molten resin extruded by means of the screw from the barrel side is extruded from the extrusion orifice to the die face side, the formation and adhesion of resin masses that form at the base of the resin strand on the die face is prevented. The inventors conducted flow analyses, as a result of which they learned that the formation of resin masses can be prevented by the above-described structure.

By means of the die plate according to the present invention, because the resin strand that has been extruded from the narrow portion of the extrusion orifice expands at the portion of the extrusion orifice having an enlarged diameter near the die face in a state where the air is shut out, the flow rate of molten resin becomes uniform at all points; this suppresses the formation of very fine resin components. However, even at this stage, very small resin components that form at the periphery of the resin strand grow and adhere to the surface of normal resin strands before they grow large and give rise to deterioration due to discoloration, scorching or the like, and are constantly being carried away. Consequently, the formation of resin masses that grow and deteriorate can be greatly reduced or suppressed to a level where they no longer are a practical hindrance.

DETAILED DESCRIPTION OF THE PREFERRED EMBODIMENTS

This invention shall now be illustrated while referring to the attached diagrams. FIG. 1 is a cross-sectional side view showing the structure of an example of a die plate 11 according to this invention. The left-hand side in the diagram is connected to an extruder barrel (not shown); the molten resin flows in the direction of arrow 14. The right-hand side of the diagram is the die face side. In the region 15 having a depth of L2 from the surface of the die face 13, the orifice is formed to a diameter of D2. The diameter D2 in this case is formed so as to be larger than the diameter D1 of the original extrusion orifice 12.

When the orifice was formed such that the relationship between the diameter D1 of a conventional extrusion orifice 12 in this case and the diameter D2 of the enlarged portion 15 was $D2/D1 = 1.1$–$2.0$, and the relationship between the diameter D2 of the enlarged portion 15 and the length L2 of the portion having the enlarged orifice diameter was $L2/D2 = 1.6$–$0.6$, good results were obtained.

FIG. 2 shows another example. Here, the base 26 of the portion 25 having an enlarged orifice diameter formed in the surface of die face 23 is beveled. Similar effects are obtained with this as with the example in FIG. 1. When a conventional drill bit is used during machining, a small bevel forms, and so this shape has the advantage that it can be fashioned without any special additional work.

With the die plate according to this invention, viewed microscopically, resin masses probably do in fact form, but because these are carried away together with the resin strand before deterioration such as yellowing occurs, these are not a practical hindrance. Hence, opportunities for the inclusion of deteriorated resin masses in the product, which have constituted a problem in the production of resin starting materials, can be greatly reduced. This fact provides a considerable advantage in terms of quality control.

Figure 1:
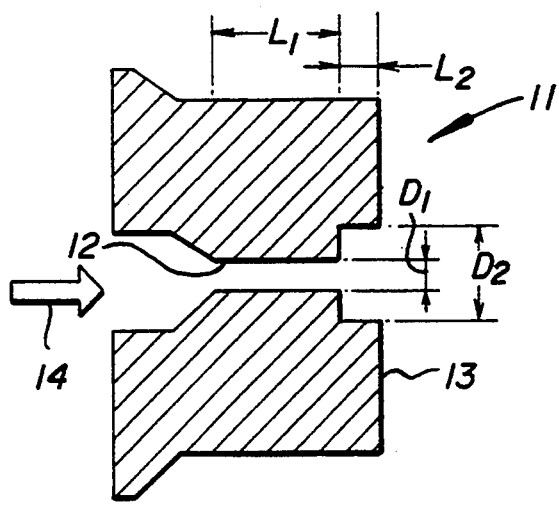
FIG. 1 is a cross-sectional side view showing a first example of a die plate according to this invention.
Figure 2:
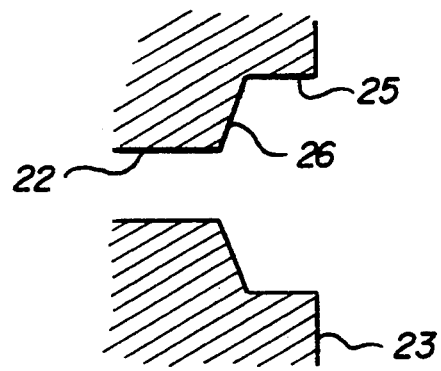
FIG. 2 is a cross-sectional view showing the essential features of a second example of a die plate according to this invention.
Figure 3:
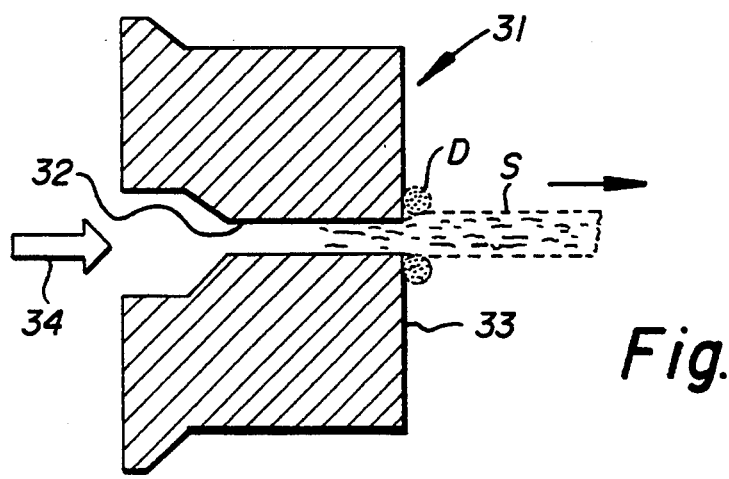
FIG. 3 is a cross-sectional view showing a die plate according to the prior art.

In the figures, the component parts of the die plate of the present invention are designated as follows:

11—die plate; 12—extrusion orifice; 13—die face; 15—portion having an enlarged orifice diameter L1, L2—lengths of extrusion orifices D1, D2—diameters of extrusion orifices

We claim:

1. A die plate for use in the melt-extrusion of plastics comprises an extrusion orifice having an enlarged portion, said extrusion orifice having a diameter (D1) and a length (L1+L2), said enlarged portion having a diameter (D2) and a length (L2), wherein D2/D1 ranges from about 1.1 to about 2.0, L2/D2 ranges from about 0.6 to about 1.6.

2. A method for preventing or reducing the formation of plastic resin masses at the die face of an extrusion die plate, said method comprising the steps of:

(a) providing an extrusion orifice having an enlarged portion, the extrusion orifice having a diameter (D1) and a length (L1+L2), the enlarged portion having a diameter (D2) and a length (L2), wherein D2/D1 ranges from about 1.1 to about 2.0, L2/D2 ranges from about 0.6 to about 1.6; and (b) passing a resin through said orifice.

3. A die plate according to claim 1 wherein said increased extrusion orifice diameter is beveled.

* * * * *